Jan. 23, 1962 D. F. BALMER ET AL 3,018,111

LIGHTWEIGHT BATTERY OPERATED TRANSISTORIZED DICTATING MACHINE

Filed Jan. 27, 1958 4 Sheets-Sheet 1

INVENTORS
DONALD F. BALMER
WILLIAM H. LYON
BY
H. G. Manning
ATTORNEY

Jan. 23, 1962 D. F. BALMER ET AL 3,018,111

LIGHTWEIGHT BATTERY OPERATED TRANSISTORIZED DICTATING MACHINE

Filed Jan. 27, 1958 4 Sheets-Sheet 2

INVENTORS
DONALD F. BALMER
WILLIAM H. LYON

BY H. G. Manning

ATTORNEY

Jan. 23, 1962 D. F. BALMER ET AL 3,018,111

LIGHTWEIGHT BATTERY OPERATED TRANSISTORIZED DICTATING MACHINE

Filed Jan. 27, 1958 4 Sheets-Sheet 3

INVENTORS
DONALD F. BALMER
WILLIAM H. LYON

BY H. G. Manning

ATTORNEY

INVENTORS
DONALD F. BALMER
WILLIAM H. LYON
BY
H. G. Manning
ATTORNEY

United States Patent Office 3,018,111
Patented Jan. 23, 1962

3,018,111

LIGHTWEIGHT BATTERY OPERATED TRANSISTORIZED DICTATING MACHINE

Donald F. Balmer, East River, and William H. Lyon, Orange, Conn., assignors to The Soundscriber Corporation, North Haven, Conn., a corporation of Connecticut Filed Jan. 27, 1958, Ser. No. 711,282
13 Claims. (Cl. 274—9)

This invention relates to sound recording and reproducing apparatus, and is directed more particularly to a light weight portable dictating machine of the type wherein a rotary disk record member is embossed with a spiral sound track. The present invention is an improvement over the invention disclosed in a prior United States patent application Serial No. 606,128, filed August 24, 1956 by Balmer et al., entitled "Portable Dictation Machine."

The principal object of this invention is to provide an improved turntable drive mechanism for a dictating machine of the above nature.

A more particular object is to provide a battery-energized motor-driven turntable drive mechanism for recording-reproducing apparatus of the character described, which embodies a resilient mechanism for delivering the power to the turntable through an intermediate drive for the purpose of isolating from the turntable mechanical noises and vibration originating in the motor.

Another object of the invention is to provide a turntable drive mechanism of the above nature, including means for minimizing the effect of inaccuracies of the parts of the drive mechanism, whereby flutter and speed fluctuations of the turntable during recording and reproducing will be substantially eliminated.

Still another object of the invention is to provide a turntable drive mechanism of the above nature embodying a pair of intermediate rubber-rimmed drive wheels fixed on a common shaft and simultaneously engageable, respectively, with the motor drive shaft and the rim of the turntable, and including means actuated by an "On-Off" control knob for disengaging said intermediate drive wheels to prevent said rubber rims from taking a permanent set when the machine is not in use.

Another object is to provide a portable battery-operated dictating machine having a turntable drive mechanism of the character described which is simple in construction, inexpensive to manufacture, easy to install and manipulate, ornamental in appearance, compact, and very efficient and durable in use.

Figures 1, 2, 3:
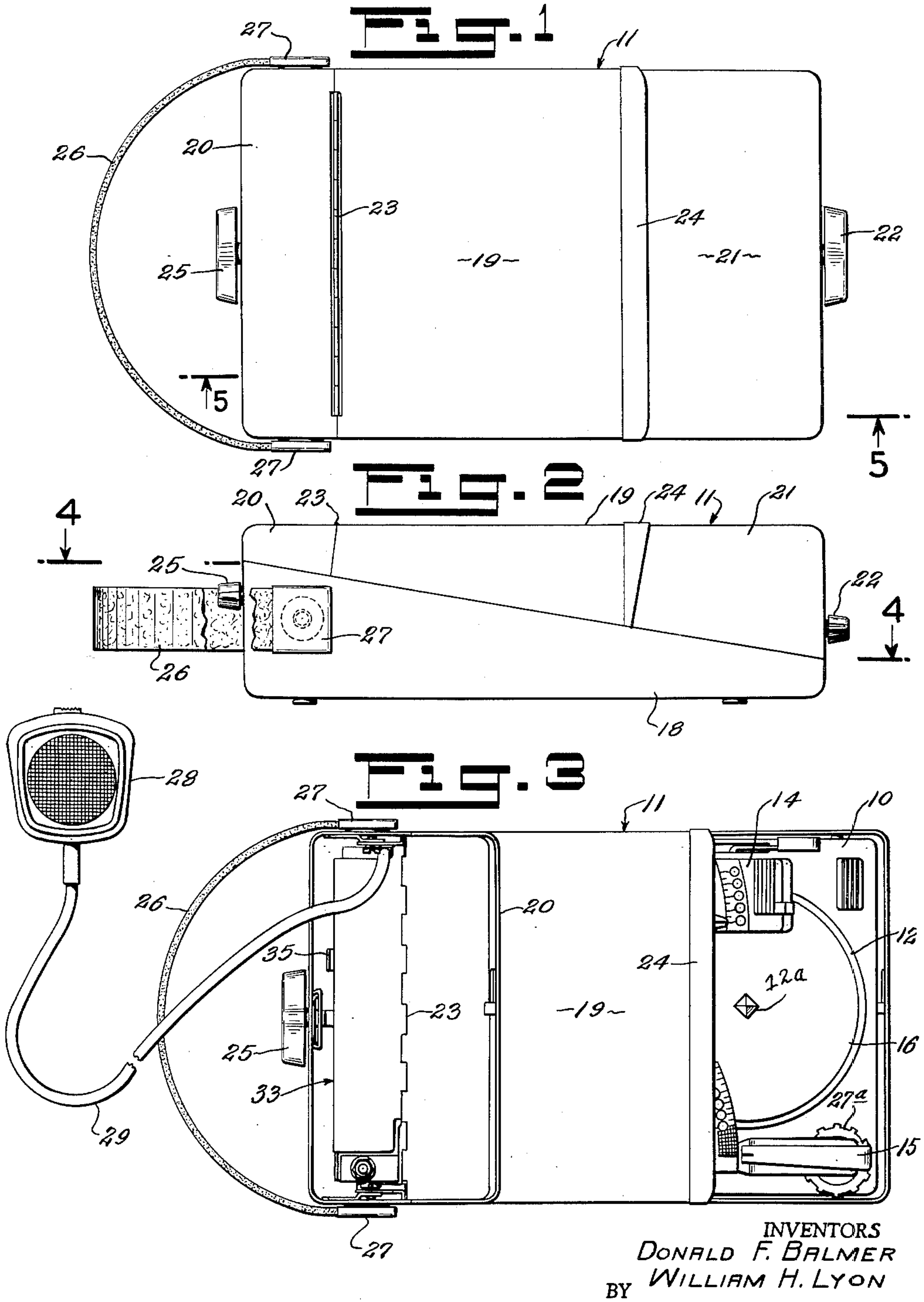
Figure 4:
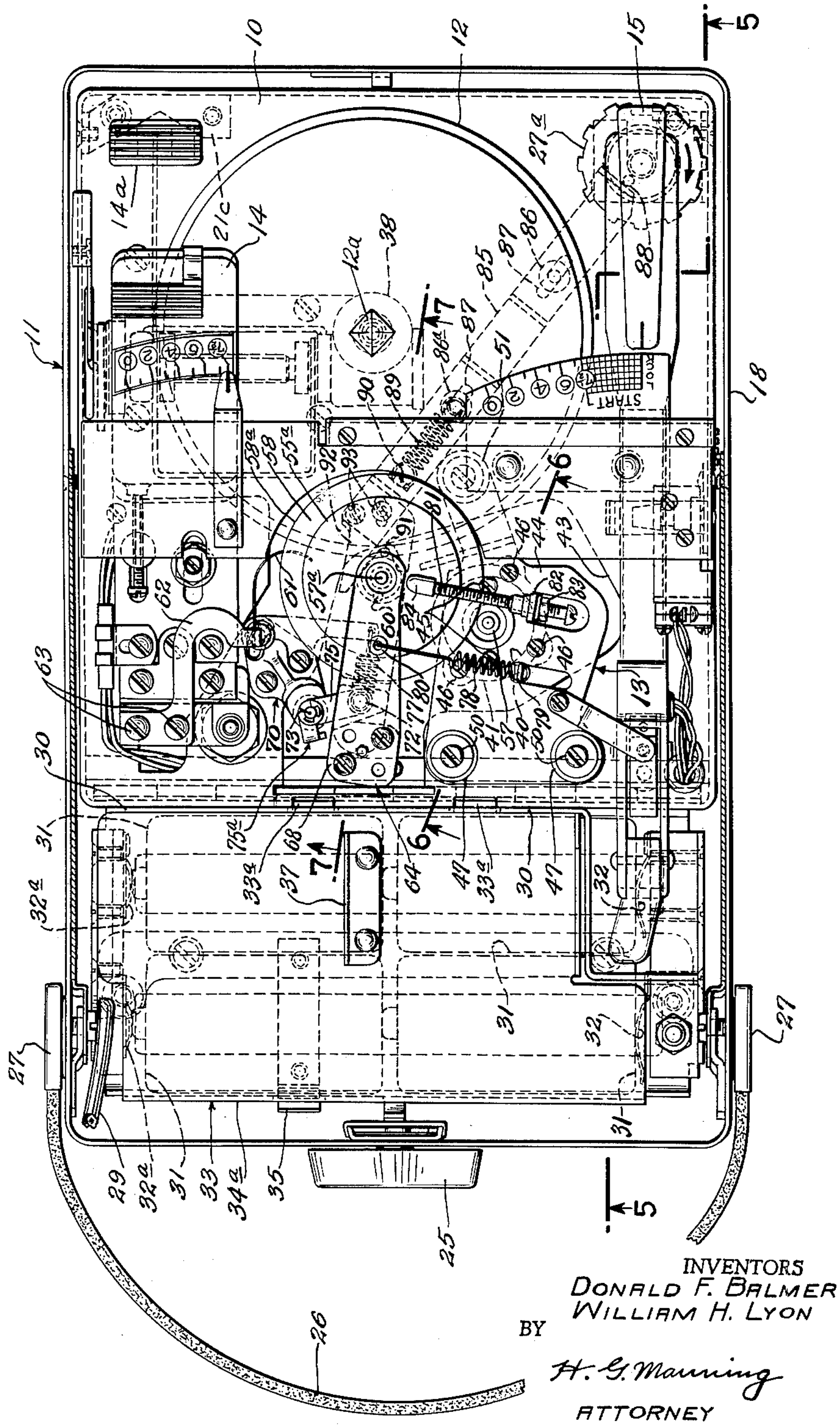
Figure 5:
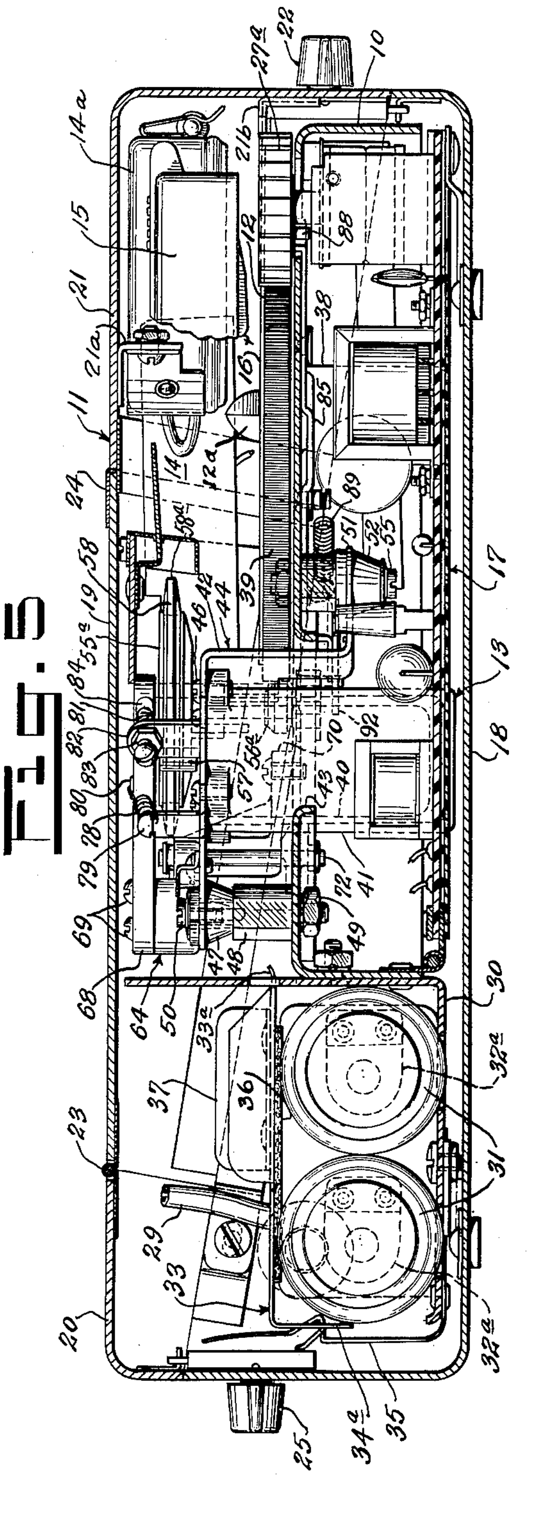
Figure 7:
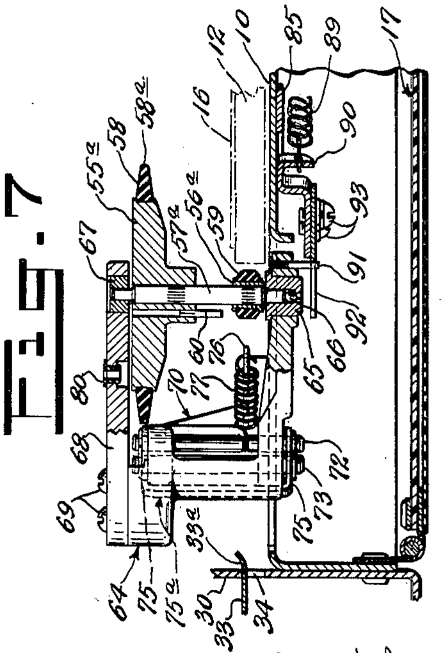
Figure 6:
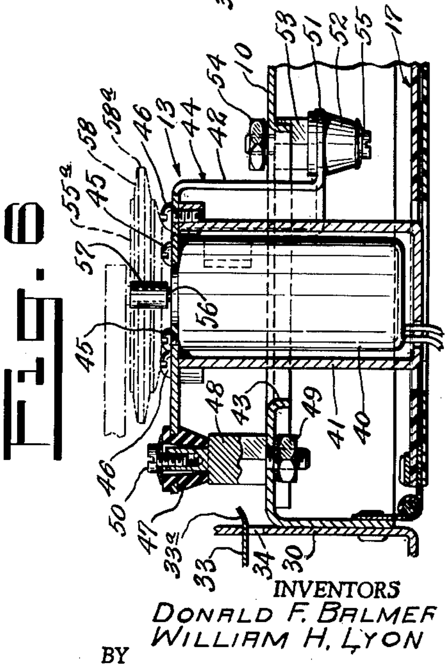
Figure 8:
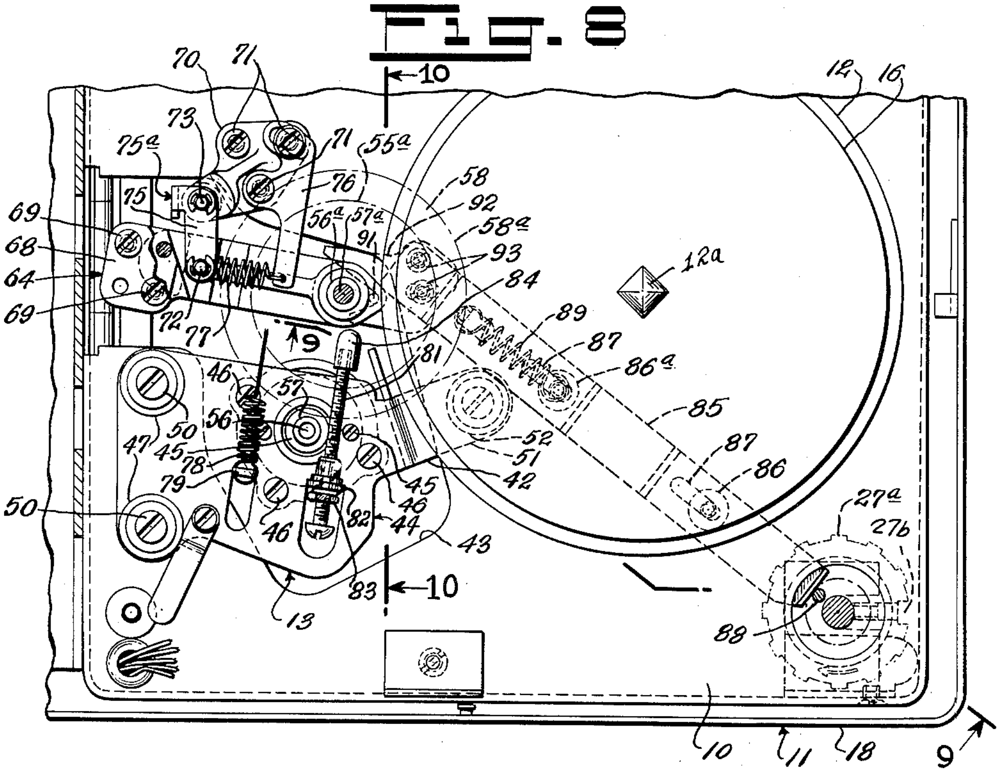
Figure 9:
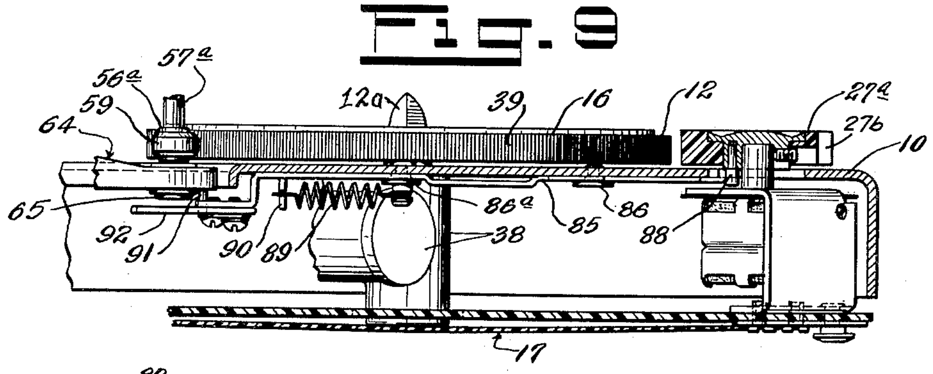
Figure 10:
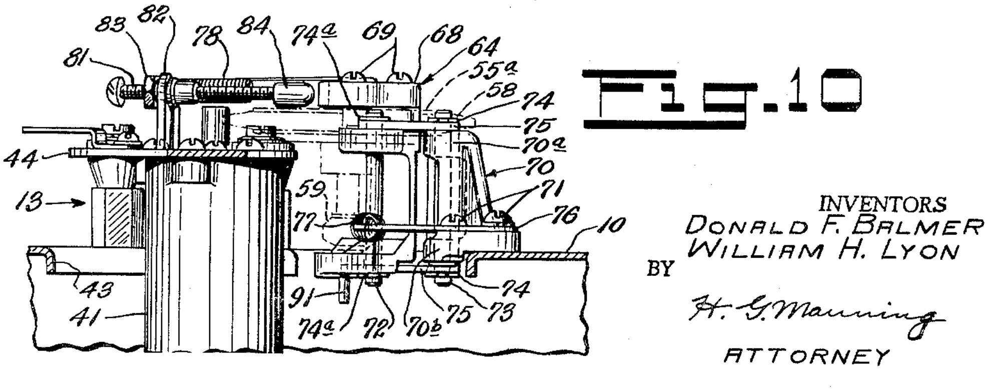

Other objects, features and advantages of the invention will be apparent from the following description, when read with reference to the accompanying drawings wherein:

FIG. 1 represents a top view of a light weight portable dictating machine embodying the present invention, FIG. 2 is a side view of the same, FIG. 3 is a top view of the same, with the front and rear covers in open position, and with the microphone removed and ready for use, FIG. 4 is a plan view, partly in section, of the dictating machine, on a somewhat larger scale, taken on the broken line 4—4 of FIG. 2, looking in the direction of the arrows, FIG. 5 is a vertical cross-sectional view of the same, taken along the line 5—5 of FIGS. 1 and 4, FIG. 6 is a vertical cross-sectional fragmentary view of the drive mechanism, taken along the inclined line 6—6 of FIG. 4, FIG. 7 is a fragmentary vertical cross-sectional view of the same, taken along the inclined line 7—7 of FIG. 4, FIG. 8 is a partial top plan view of the dictating machine, with portions broken away to illustrate further details of the drive mechanism, FIG. 9 is a vertical cross-sectional view of the same, taken along the inclined line 9—9 of FIG. 8, and FIG. 10 is a vertical cross-sectional view, taken along the line 10—10 of FIG. 8.

Referring now to the drawings, wherein like reference numerals denote corresponding parts throughout the several views, the numeral 10 indicates a chassis which supports a motor assembly 13, a turntable 12 having a knurled edge 39, a recording arm 14, a playback arm 15, an "on-off" control knob 27*a*, and a recording disk record 16 nonrotatably mounted on a square turntable spindle 12*a*.

Attached to the motor assembly is an amplifier assembly 17 (see FIG. 5), both assemblies being housed in a cabinet 11, which consists of a lower section 18 rigidly secured to an upper section 19 (FIG. 2).

A rear cover 20 is joined to the upper section 19 of the cabinet 11 by a hinge 23, to provide compartments for a microphone 28, an associated cable 29, and four dry batteries 31, as hereinbelow more fully described. The rear cover 20 is secured in place by a releasable snap lock 25.

A detachable front cover 21 is also provided to protect the operating controls of the equipment since it will seat only when these arms and controls are all in their "off" positions; the front cover 21 is then held in place by a manually operated releasable snap lock 22 similar to the lock 25. A decorative band 24 on the upper section 19 forms an offset flange to receive the rear edge of the front cover 21. Still referring to FIGURE 5, a meter 14*a* for checking battery output voltage is mounted inside front cover 21 on a bracket 21*a* fitting between recording arm 14 and playback arm 15 so that these arms must be spaced apart at their "off" positions (FIGURES 3, 5) before the cover can be fastened in its closed position. An inwardly-projecting lug 21*b* is mounted on the inside front face of cover 21 in such position as to fit into a notch 27*b* in "on-off" control knob 27*a* when this knob is in its "off" position, as will be clearly seen from an examination of FIGURES 5, 8 and 9. Thus, when control knob 27*a* is in its "on" position, lug 21*b* will jam and prevent cover closure. A similar inwardly-projecting lug 21*c* is so positioned on the inside front face of cover 21 as to jam against the record-playback knob 14*a* unless this knob is depressed to its "playback" or "stylus-lifted" carry position. Accordingly, it will now be seen that the cover 21 cannot be fastened into its closed position unless recording arm 14 and playback arm 15 are in their "off" positions. Further still, this cover cannot be fastened in its closed position unless the "on-off" knob 27*a* is in its "off" position to permit lug 21*b* to interfit with slot 27*b*; also, record-playback knob 14*a* must be in its "off" position to avoid jamming with lug 21*c* on the cover. In this manner, there is adequate assurance that the machine is off and all arms and controls secured in position for traveling before the cover can be closed. A curved flexible handle 26 is pivotally attached to the rear of the bottom section 18 of the cabinet by detachable button fasteners 27.

Secured to the rear end of the chassis 10 is a battery box 30, to which access can be had when the rear compartment cover 20 is open. The battery box 30 contains the four dry cells 31 which supply power for the motor 13 and the amplifier 17.

The amplifier assembly 17, which forms no part of the present invention, is operated by transistors, and is energized by the four dry cells 31.

A pair of battery connection spring clips 32, mounted upon insulating blocks at one end of the battery box 30, make electrical contact with the negative terminal ends of the dry cells 31 (see FIG. 4). The clips 32 are of U-shaped construction to prevent the batteries from causing damage to the amplifier when inadvertently inserted into the box 30 with the wrong polarity.

The positive ends of the batteries make contact with solid spring connection clips 32$a$ which are also mounted upon insulating blocks (see FIGS. 4 and 5). The battery box 30 is fitted with an angular cover plate 33 having forward horizontal ends 33$a$ which clip into openings 34 in said battery box 30 as indicated most clearly in FIGS. 6 and 7, and with the downwardly projecting rearward end 34$a$ thereof. The cover plate 33 is removably secured by a spring latch 35 extending upwardly from the bottom of said battery box.

The underside of the angular battery cover plate 33 is lined with a rubber pad 36 (FIG. 5) which resiliently presses upon the battery cells 31 in the battery box 30. Provision is also made of an angular partition cleat 37 secured to and extending upwardly from the cover plate 33 to provide a compartment at one side of said cleat for the microphone 28, and another compartment at its other side for the microphone cable 29, so as to prevent the microphone from shifting around when the machine is being carried about.

Since the construction and operation of the recording arm 14, the playback arm 15, and their associated control mechanisms are fully described in the above-mentioned application, details of their construction will not be duplicated herein.

*Turntable drive*

The turntable drive mechanism embodying the present invention is best illustrated in FIGS. 4, 5, and 9 of the drawings. This mechanism includes a central turntable shaft extending upwardly through a gear box 38.

The turntable motor drive assembly 13 includes an elongated vertical D.C. motor 40 (FIG. 6) contained within a heavy cylindrical shield 41 which extends upwardly through an opening 43 in the chassis 10, said motor being secured at its upper end to a motor bracket 44 by machine screws 45, the motor shield 41 being secured to the bracket 44 by machine screws 46 (see FIG. 6).

The rear end of the motor bracket 44 extends above the chassis 10, and is flexibly secured thereto by a pair of upstanding conical shock-absorbing rubber grommets 47 (FIG. 8), which are secured by stud posts 48 to said chassis 10 by means of bottom nuts 49. A pair of headed machine screws 50 extend through the grommets 47 and are secured within the reduced upper ends of the studs 48.

The front end of the motor bracket 44 is formed with a downwardly directed portion 42 (FIG. 6) which extends through the chassis opening 43, and has an outer end portion 51 bent horizontally under the chassis 10 and in spaced relation thereto. The end portion 51 of the motor bracket 44 is also resiliently supported with respect to the chassis 10 by a third conical rubber shock absorbing grommet 52 secured against a stud post 53 (FIG. 6) fixed at one end to said chassis by a nut 54. The post 53 is secured to the grommet 52 by a machine screw 55.

The motor shield 41 is preferably made of metal, such as lead, to increase the mass of the motor assembly and thereby reduce the vibration and mechanical noise transmitted from the motor 40.

The output shaft 56 (FIG. 6) of the motor 40 has tightly fitted thereon a cylindrical sleeve 57 which delivers power to the turntable 12 through the intermediate drive wheel assembly, now to be described (see FIGS. 4–8).

As can best be seen in FIG. 7, the drive wheel assembly includes a large heavy idler wheel 55$a$ and a smaller idler wheel 56$a$, both of which are secured in spaced apart relation on an idler shaft 57$a$. The idler wheel 55$a$ is fitted with a thin tapered resilient soft rubber rim 58 which has a narrow double-beveled pointed edge 58$a$ at its outer circumference which is adapted to engage the sleeve 57 of the drive motor 40 (FIG. 4) and thereby isolate the motor vibration. The heavy weight of the idler wheel 55$a$ further assists in damping motor vibration and mechanical disturbances.

The small idler wheel 56$a$ is fitted with a cylindrical soft rubber rim 59 (FIG. 4) having upper and lower beveled edges, said wheel being adapted to engage the knurled edge 39 of the turntable 12 for transmitting driving power thereto.

The idler shaft 57$a$ is rotatably mounted in a yoke 64 (FIG. 7) and is journalled at its lower end in a bearing 65, firmly mounted in said yoke. A ball bearing 66 is located centrally in the bottom of the bearing 65 to receive the thrust from the idler shaft 57$a$. The yoke 64 also includes a separable upper arm portion 68 firmly secured to said yoke by means of screws 69. The arm portion 68 of the yoke 64 also contains a top bearing 67 located in spaced relation to the lower thrust bearing 65 for journalling the upper end of the idler shaft 57$a$.

As illustrated in FIG. 7, a depending pin 60 is firmly mounted in the hub of the large idler wheel 55$a$, and serves to provide an audible warning, by striking a curved resilient metallic reed 61 (FIG. 4), when the recording arm 14 reaches the inside end of the disk record 16, said reed being mounted in a bracket 62 which is firmly attached to the rear end of the recording arm 14 by screws 63 (see FIG. 4).

The yoke 64 is supported by a bracket 70, firmly attached to the chassis 10 by screws 71 (FIG. 10). The support bracket 70 is provided with a pair of vertically spaced journal portions 70$a$, 70$b$ through which a vertical pivot pin 73 extends. Mounted at the upper and lower ends of the pivot pin 73, and held thereon by E-rings 74, are a pair of spaced parallel arms 75 of a U-shaped intermediate bracket member 75$a$ (FIGS. 8, 10). The outer ends of the bracket arms 75 are journalled upon the ends of a pivot pin 72, vertically secured in the yoke 64 near its rearmost end.

The bracket arms 75 are also held in place on the pivot pin 72 by a pair of E-rings 74$a$ (see FIG. 10).

The rim 59 of the smaller rubber idler wheel 56$a$ is held firmly in contact with the knurled edge 39 of the turntable 12 by a tension coil spring 77, which is connected to the pivot pin 72 and an adjustable arm 76 secured to the support bracket 70 (see FIG. 8).

The larger idler wheel 55$a$ is held in firm contact with the motor sleeve 57 by means of a tension coil spring 78, one end of which it attached to the arm 68 of the yoke 64 in a bushing 80 thereof, and the other end of which is attached to an upwardly extending anchor lug 79 struck up from the upper surface of the motor bracket 44 (see FIGS. 4, 5, and 8).

The penetration of the drive sleeve 57 into the tapered peripheral edge 58$a$ of the soft rubber rim 58 of the large idler wheel 55$a$ is limited by an adjustment screw 81 (FIGS. 4, 8 and 10) mounted in a bracket 82 which is struck up from the motor bracket 44. A lock nut 83 holds the screw 81 in firm position, after adjustment. A rounded insulating bumper 84 firmly attached to the end of the adjustment screw 81 serves as a stop for the yoke 64 when in the drive position.

In order to prevent the rubber rims 58, 59 of the intermediate driving wheels 55$a$ and 56$a$ from taking a permanent set, due to continuous standby contact with the motor drive sleeve 57 and the turntable 12 respectively, means is provided to automatically relieve said contacts whenever the equipment is not in use. To this end, there is provided a slider bar 85 (FIG. 8) which is secured to the underside of the chassis 10 by two shouldered pins 86, 86$a$ and which is permitted to slide along said pins by a pair of spaced-apart slots 87, 87, formed in said slider bar.

The front end of the slider bar 85 is actuated by a vertical pin 88 (FIGS. 4, 5, 8, 9) secured to the "on-off" rotatable control knob 27$a$. Thus, when the knob 27$a$ is in the "off" position, the slider bar 85 will be held in the rearward position, and when said knob 27*a* is turned to the "on" position, the pin 88 swings out of the way, and permits the slider bar 85 to move toward the knob 27*a* by the force of a coil spring 89.

The spring 89 is attached to the slider bar 85 by a struck-out lug 90 (FIG. 9) at one end, and is attached to the chassis 10 by the rearmost pin 86*a*, whereby said spring will urge the slider bar in a forward direction.

A V-shaped adjustable fitting 92 is attached to the rear end of the slider bar 85 by screws 93 (FIG. 7). By means of this construction, it will be seen that whenever the knob 27*a* is manually turned to the "off" position, the V-shaped fitting 92 of the slider bar 85 will contact the pin 91, which is firmly attached to the yoke 64, thereby pushing the latter and the intermediate drive wheels 55*a* and 56*a* away from their driving contacts with the output sleeve 57, and the rim 39 of the turntable 12, respectively.

When the control knob 27*a* is turned to the "on" position, the slider bar 85 will be pulled away from the pin 91 and the drive wheel assembly will be permitted to make its normal driving contacts.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. A turntable friction drive mechanism providing a driving connection between a rotatably mounted driven member and a rotatably mounted turntable comprising, in combination, a supporting chassis, a rotatable idler member movably mounted on said chassis, resilient means urging said idler member into frictional engagement at a first point of tangency with said turntable and urging said idler member into frictional engagement at a second point of tangency with said driven member, the two radial planes respectively defined by the rotation-axis of said idler member and said two points of tangency being substantially normal planes, thereby isolating said turntable from the vibration of said driven member.

2. A turntable friction drive mechanism providing a driving connection between a rotatably mounted driven member and a rotatably mounted turntable comprising, in combination, a supporting chassis, a rotatable idler member movably mounted on said chassis and having a thin flexibly-deformable peripheral rim, resilient means urging said idler member into frictional engagement at a first point of tangency with said turntable and urging said deformable rim of said idler member into flexibly-deformed frictional engagement at a second point of tangency with said driven member, the two radial planes defined by the rotation-axis of said idler member and said two respective points of tangency being substantially normal planes, thereby isolating said turntable from the vibration of said driven member.

3. A turntable friction drive mechanism providing a driving connection between a rotatably mounted driven member and a rotatably mounted turntable comprising, in combination, a supporting chassis, a mounting linkage movably mounted on said chassis, a rotatable idler member movably mounted on said linkage, resilient means joining said chassis and said mounting linkage and urging said idler member into frictional engagement at a first point of tangency with said turntable and urging said idler member into frictional engagement at a second point of tangency with said driven member, the two radial planes respectively defined by the rotation-axis of said idler member and said points of tangency being substantially normal planes, thereby isolating said turntable from any vibrations of said driven member.

4. The combination defined in claim 3 in which said mounting linkage is doubly pivoted to provide two degrees of freedom for the movement of said idler member in response to the urging of said resilient means.

5. In a turntable drive mechanism for sound recording and reproducing apparatus, the combination comprising a supporting chassis, a disk record-supporting turntable rotatably mounted on said chassis, an electric drive motor mounted on said chassis with its drive shaft parallel with and offset from the axis of said turntable, intermediate mechanism driven by said motor drive shaft for driving said turntable, said mechanism comprising a yoke member pivotally supported with respect to said chassis for movement in a plane parallel with said chassis and independently movable in the directions of said drive motor shaft and said turntable, an idler shaft journaled in said yoke member and having its axis of rotation parallel with said drive motor shaft and the axis of said turntable, a first resilient means urging said idler shaft in the direction of said drive shaft, a second resilient means urging said idler shaft in the direction of said turntable, a large idler wheel fixed on said idler shaft and resiliently engageable with said motor drive shaft, and a smaller idler wheel also fixed on said idler shaft and resiliently engageable with the periphery of said turntable, said large idler wheel being fitted with a sharply tapered resilient rim yieldably engaging said motor drive shaft and held in a precise preselected position by a stop member mounted on said chassis and positioned to limit the movement of said large idler wheel toward said drive shaft.

6. The combination defined in claim 5 including adjustable means connected to said stop member for limiting the movement of said large idler wheel in the direction of said motor drive shaft.

7. In a dictating machine, in combination, a chassis, a turntable rotatably mounted on said chassis for supporting a recording disk, a motor drivingly connected to said turntable, a casing partially enclosing said chassis and leaving a portion of said turntable exposed, a cover shaped to interfit with said casing to be closed over said exposed portion of said turntable, latching means to hold said cover closed on said casing, an arm extending over said exposed portion and movably mounted on said chassis to move from an off position toward a stop position during recording, said arm supporting a recording transducer head on said disk during recording, and means comprising an extension on the underside of said cover extending toward said arm to interfit therewith to permit latching said cover on said casing only when said arm is in its off position.

8. The machine as defined in claim 7 in which there is leverage mechanism for moving said arm between a record and a non-record position, and a control element therefor extending from said casing in a position and direction to interfit with one of said extensions only when said arm is in its non-record position.

9. In a dictating machine, in combination, a chassis, a turntable rotatably mounted on said chassis for supporting a recording disk, a motor drivingly connected to said turntable, a casing partially enclosing said chassis and leaving a portion of said turntable exposed, a cover shaped to interfit with said casing to be closed over said exposed portion of said turntable, latching means to hold said cover closed on said casing, an arm extending over said exposed portion and movably mounted on said chassis to move from an off position toward a stop position during recording, said arm supporting a recording transducer head on said disk during recording, an electric on-off switch for said motor mounted on said casing adjacent said exposed portion of said turntable, and means comprising extensions on the underside of said cover extending toward said arm and said switch to interfit therewith to permit latching said cover on said casing only when said switch and said arm are in their off positions.

10. In turntable recording and transcribing apparatus the combination of a chassis, a turntable rotatably mounted on said chassis, a motor mounted on said chassis to drive said turntable, friction drive mechanism including a vibration damping assembly movably mounted on said chassis to drive said turntable, an idler wheel in said assembly, a soft rim on said wheel beveled to be flexible radially and axially, and resilient means for urging said deformable rim into engagement with the drive member of said motor to flexibly deform said rim while still maintaining resilience in said rim between said idler wheel and said drive member thereby isolating said turntable from vibration.

11. The combination defined in claim 10 including disengaging means interconnected with said vibration damping assembly for overcoming the urging of said resilient means to disengage said rim from said wheel whereby said rim may be maintained undeformed between operational periods of said apparatus.

12. The combination defined in claim 10 including stop means supported on said chassis and positioned to limit movement of said damping assembly under the urging of said resilient means to arrest the deformation of said rim to a predetermined degree whereby said deformable rim still has sufficient resiliency to absorb normal shocks and vibrations when in driving position.

13. Apparatus according to claim 10 in which the drive mechanism between said motor and said turntable includes a rubber tired pulley interposed therebetween to supplement the damping effect of said damping assembly.

References Cited in the file of this patent

UNITED STATES PATENTS

| | | |
|---|---|---|
| 1,813,502 | Madsen | July 7, 1931 |
| 2,261,465 | Grange | Nov. 4, 1941 |
| 2,318,183 | Roberts | May 4, 1943 |
| 2,326,667 | Morrison | Aug. 10, 1943 |
| 2,353,763 | Rodman | July 18, 1944 |
| 2,554,347 | Rouse | May 22, 1951 |

FOREIGN PATENTS

| | | |
|---|---|---|
| 133,284 | Sweden | Oct. 16, 1951 |
| 1,071,735 | France | Sept. 3, 1954 |
| 1,133,804 | France | Apr. 2, 1957 |